Patented July 3, 1951

2,559,340

UNITED STATES PATENT OFFICE 2,559,340

TRIMETHYLISOTHIOCYANATOSILANE

Ben A. Bluestein, Scotia, N. Y., assignor to General Electric Company, a corporation of New York No Drawing. Application June 21, 1947, Serial No. 756,325

1 Claim. (Cl. 260—448.2)

This invention is concerned with organo-substituted silicon compounds and the preparation of said compounds. More particularly, this invention relates to compositions of matter corresponding to the general formula $$(CH_3)_n Si(NCZ)_{4-n}$$

where $n$ is an integer or a whole number equal to from 1 to 3, inclusive, and Z is a member of the class consisting of oxygen and sulphur atoms.

Silicon compounds have been known heretofore wherein the —NCO radical is attached directly to the silicon atom. For example, H. H. Anderson and G. S. Forbes have prepared compounds such as $Si(OCH_3)_a(NCO)_{4-a}$ [see J. A. C. S. 66, 1703 (1944)] and the former has disclosed the preparation of compounds of the general formula $SiCl_a(NCO)_{4-a}$ [ibid., 934 (1944)] where $a=0, 1, 2,$ or 3. As far as I am aware, no chemical compounds have been previously prepared wherein both an organic group and either an —NCO or an —NCS radical are attached directly to the silicon atom, the organic radical being attached to the silicon atom through a C-Si bond. The chemical compounds embraced by my claimed invention are characterized by the fact that the organic group attached to the silicon atom by a C-Si linkage is quite stable to heat and water.

Throughout the description of this invention, as well as in the appended claim, reference to isocyanatosilanes and isothiocyanatosilanes is intended to mean the structures

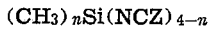

respectively. The foregoing structures have been established by determining the group refractivity of the —NCS and —NCO radicals, and by infra-red absorption spectra.

There are several ways in which my claimed chemical compositions may be prepared. One method comprises effecting reaction between (1) a compound corresponding to the general formula $(CH_3)_n Si(X)_{4-n}$ where $n$ is a whole number equal to 1 to 3, inclusive, and X is a halogen, for example, chlorine, bromine, iodine, etc., and (2) a chemical compound having the general formula MNCZ where M is a metal selected from the class consisting of silver and alkali metals, and Z is a member of the class consisting of oxygen and sulphur atoms. For brevity, chemical compounds described in (2) above will hereinafter be referred to as the "metal cyanate."

Examples of chemical compounds corresponding to the one embraced by the general formula disclosed above in (2) are silver isocyanate (AgNCO), silver isothiocyanate (AgNCS); compounds corresponding to the general formula AkNCZ where Ak is an alkali metal and Z has the same meaning as above, e. g., sodium isocyanate, sodium isothiocyanate, potassium isocyanate, potassium isothiocyanate, cesium isocyanate, etc. I prefer to use the methylchlorosilanes together with the alkali metal isocyanates or the alkali metal isothiocyanates in the preparation of my claimed methyl-substituted isocyanatosilanes and isothiocyanatosilanes.

The exact manner in which reaction between the ingredients may be effected may be varied. One method comprises effecting reaction, e. g., by heating under reflux, between, for instance, a methylhalogenosilane and the metal cyanate. This is advantageously accomplished by placing the metal cyanate in a Soxhlet extractor and continually passing and recycling the methylhalogenosilane over the metal cyanate while heating the mixture. Thereafter, the reaction mass is fractionally distilled to isolate the desired compound.

Another method comprises placing the metal cyanate and the methylhalogenosilane in a pressure reactor and heating the closed reactor with its contents at elevated temperatures of the order of, for example, from about 200° to 375° C., preferably from 250° to 350° C., and thereafter recovering the desired reaction product by fractional distillation.

The molar ratio of the reactants when employing either one of the two methods disclosed above will vary depending, for example, upon the desired product, conditions of reaction, etc. Thus, for example, when it is desired to prepare dimethyl di-isocyanatosilane [$(CH_3)_2Si(NCO)_2$], for each mol of dimethyldichlorosilane, I may employ from about 2 to 6, preferably from about 2.2 to 4, mols of the metal cyanate, for instance, potassium isocyanate. In the same way, when it is desired to prepare, for example, trimethylisothiocyanatosilane [$(CH_3)_3Si(NCS)$], for each mol of the trimethylhalogenosilane, for instance, trimethylchlorosilane, I may use from 1 to 4, preferably from 1.2 to 3, mols of the metal isothiocyanate.

The temperature at which the reaction is carried out may also be varied within wide limits. Where the reaction is conducted in an open vessel at normal (atmospheric) pressures, the temperature usually may range from room temperature to the reflux temperature of the mass or higher. Higher temperatures will cause the reaction to proceed with greater speed in accordance with the well-known law of chemical reactions. I have found that for the preparation of the methyl-substituted isocyanatosilanes it is advantageous to carry out the reaction at atmospheric or superatmospheric pressures at temperatures of the order of from about 200° to 350° C. The methyl-substituted isothiocyanatosilanes are advantageously and preferably prepared by effecting reaction between the ingredients in an open vessel at temperatures ranging from room temperature to the reflux temperature of the mass.

In order that those skilled in the art may better understand how my claimed chemical compounds may be prepared, the following examples are given by way of illustration and not by way of limitation.

Example 1

About 60.8 grams (0.75 mol) dry, solid NaNCS were placed in a Soxhlet extractor and about 130.2 grams (1.2 mols) $(CH_3)_3SiCl$ were placed into the extractor in such a manner that refluxing of the reaction mixture was conducted for one hour while the trimethylchlorosilane was continually passing over and reacting with the solid NaNCS. During this period the temperature of the boiling liquid rose from 60° C. to 119° C. At the end of this time, the reaction mass was fractionally distilled to yield 76.8 grams of trimethylisothiocyanatosilane $$[(CH_3)_3Si(NCS)]$$

having a boiling point of from 141.8°–142.0° C. The refractive index and density of the compound were as follows: $n_D^{20}=1.4809$; $d_4^{20}=0.9257$. Analysis of this compound for the radical —NCS showed it to be 43.7 per cent (calculated 44.26%). The compound had a molecular refractivity of 40.34.

Example 2

A mixture of 65 grams (0.51 mol) $(CH_3)_2SiCl_2$, 200 cc. dry benzene, and 90 grams (1.1 mols) NaNCS were heated together at the reflux temperature of the mass in the same manner and using the same equipment as in Example 1. During the 1½ hours reflux period, the temperature of the boiling solution rose from 74° C. to 120° C. The reaction mass was fractionally distilled to yield 44 grams of $(CH_3)_2Si(NCS)_2$ having a boiling point of 217–218° C. This compound, dimethyl di-isothiocyanatosilane, had the following refractive index and density:

$$n_D^{20}=1.5661;$$

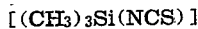. Analysis of the compound for the —NCS radical showed it to be present in an amount equal to 66.2 per cent (calculated 66.65%). The molecular refractivity of the compound was 50.18.

Example 3

In this example, methyl tri-isothiocyanatosilane $[(CH_3)Si(NCS)_3]$ was prepared by refluxing, for 2 hours, a mixture of 254 grams $CH_3SiCl_3$ and 81 grams (1 mol) NaNCS using the same apparatus and procedure as employed in Example 1. During the reflux period, the temperature rose from 67° C. to 163° C. The reaction mass was fractionally distilled to yield 35 grams of methyl tri-isothiocyanatosilane; B. P. 268–270° C., M. P. 70–71° C. Analysis of this compound showed it to contain 43.52 per cent sulfur (calculated 44.26%).

Example 4

Dimethyl di-isocyanatosilane $$[(CH_3)_2Si(NCO)_2]$$

was prepared by refluxing for about 3 hours a mixture of 100 cc. dry benzene, 29.7 grams (0.23 mol) $(CH_3)_2SiCl_2$, and 75 grams (0.5 mol) AgNCO. Distillation of the reaction mass yielded 8.2 grams of $(CH_3)_2Si(NCO)_2$ having a boiling point of 137.5–138° C. This compound had a refractive index $n_D^{20}=1.4209$, a density =1.066, and a molar refractivity equal to 33.82 (calculated 33.78).

Dimethyl di-isocyanatosilane was also prepared by heating in a stainless steel bomb for 3 hours at 320° C. a mixture comprising 81 grams (1.0 mol) KNCO and 65 grams (0.5 mol) $(CH_3)_2SiCl_2$ and isolating the aforementioned isocyanatosilane compound from the reaction mass.

Example 5

Trimethylisocyanatosilane was prepared by cycling and recyling for 3 hours 136.65 grams (1.26 mols) trimethylchlorosilane over 81 grams (1.0 mol) KNCO heated to a temperature of about 300–335° C. Fractional distillation of the reaction product yielded about 76 grams $$(CH_3)_3Si(NCO)$$

which is a liquid having a boiling point of 91.3–91.6° C. The compound has the following physical properties; $d_4^{20}=0.850$; $n_D^{20}=1.3943$; molar refractivity=32.44 (calculated 32.03).

Example 6

Methyl tri-isocyanatosilane may be prepared in the same manner as in Example 4 (second synthesis disclosed) with the exception that 120 grams KNCO (1.5 mols) are employed in place of the 81 grams KNCO used in that example and methyltrichlorosilane in place of the trimethylchlorosilane employed therein.

The compounds embraced by the formula disclosed in the first paragraph of the description of this invention have many uses, for example, as intermediates in the preparation of other organic compounds. They are especially useful for rendering water-repellent materials which are originally water-non-repellent. The use of my claimed compositions of matter for inducing water-repellency does not result in the formation of hydrogen halide by-products as is the case in the process employing organohalogenosilanes as water-repellent materials, which process is more fully disclosed and claimed in Patnode Patent 2,306,222, issued December 22, 1942, and assigned to the same assignee as the instant invention. Since my claimed compounds are formed from methyl-substituted halogenosilanes, it is possible, by the use of my process for making the claimed compounds, to effect separation of azeotropic mixtures of trimethylchlorosilane and silicon tetrachloride.

What I claim as new and desire to secure by Letters Patent of the United States is:

Trimethylisothiocyanatosilane corresponding to the formula $(CH_3)_3Si(NCS)$.

BEN A. BLUESTEIN.

(References on following page)

REFERENCES CITED

The following references are of record in the file of this patent:

UNITED STATES PATENTS

| Number | Name | Date |
|---|---|---|
| 2,253,128 | Langkammerer | Aug. 19, 1941 |
| 2,405,983 | Barry | Aug. 20, 1946 |

OTHER REFERENCES

Reynolds: "Journal Chem. Society" (London), vol. 89 (1909), pages 397-8.

Forbes et al.: "Jour. Amer. Chem. Soc.," vol. 62 (1940), pages 761-763.

Anderson: "Jour. Amer. Chem. Soc.," vol. 66 (1944), pages 934, 935.

Forbes et al.; "Jour. Amer. Chem. Soc.," vol. 66 (1944), pages 1703-1706.

Anderson: "Jour. Amer. Chem. Soc.," vol. 67 (1945), pages 2176, 2177.

Anderson: "Jour. Am. Chem. Soc.," vol. 69 (1947), pages 3049-51.

Forbes et al.: "Jour. Am. Chem. Soc.," vol. 70 (1948), pages 1043-1044.